Nov. 9, 1937.  A. THODE  2,098,840
NUT LOCK
Filed Jan. 16, 1937
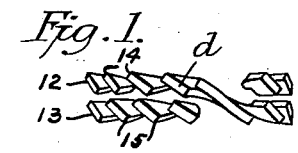
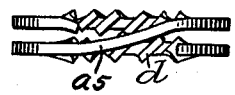
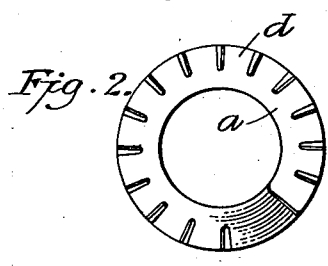
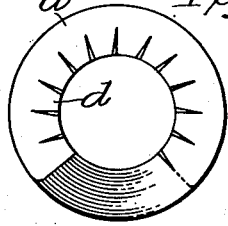
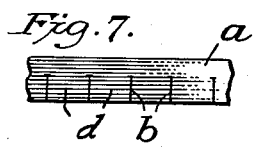
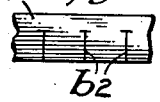
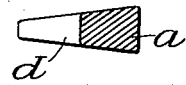
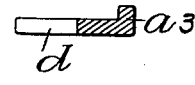
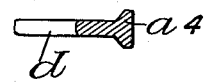
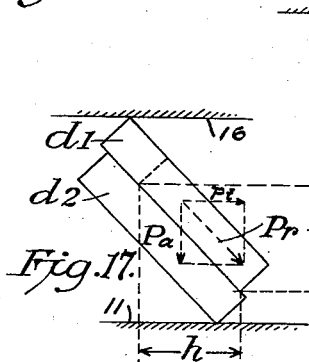
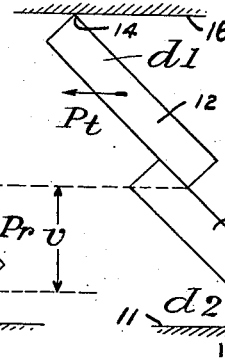
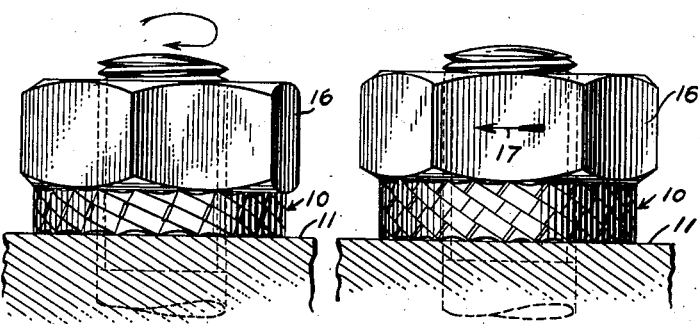
INVENTOR,
Adolf Thode,
BY
Harold D. Penney
ATTORNEY.

Patented Nov. 9, 1937

2,098,840

UNITED STATES PATENT OFFICE 2,098,840

NUT LOCK

Adolf Thode, Hamburg-Billbrook, Germany

Application January 16, 1937, Serial No. 120,889
In Germany January 21, 1936

19 Claims. (Cl. 151—36)

Locking or securing washers used as nut or bolt locks have been known in which nut-engaging portions or flaps bent in a fan-like manner, partially overlap each other, in order to avoid the complete flattening by pressure of the washers and flaps to the original plane of the washer or disk, in case of excessive pressure on the washer caused by the tightening of the nut on the bolt. This type of known locking washer however comprises only one turn, assuming the shape of a closed annular surface. Other nut locking means, the so-called spring washer with more than one winding, are provided with upwardly bent portions at the ends of the spiral only. Such spiral-like locking means, while possessing an interior spiral-like action, do not allow their bent up ends to become sufficiently active for the locking of the nuts, as in the case of lock disks having overlapping flaps distributed along the periphery.

In the case of locking disks with upwardly bent overlapping flaps a spring action is at best, only possible in the individual flaps. In the case of a lengthening of the bolt by heat expansion or stretching, there is the disadvantage, in the known locking disks that the sharp edges of the upwardly bent flaps lose the power of maintaining sufficient engagement with the nut or with the stationary base of the part secured by the nut and bolt, so that there is the liability of the loosening or releasing of the nut. Even in washers where a partial overlapping of the adjoining bent up flaps prevents the complete bending back of said flaps into the plane of the disk, there is the difficulty that the locking disks already subjected to the forcible tightening of the nuts or bolts have their locking action reduced as compared with resilient lapping sections.

The object of the present invention is to provide nut and bolt locking means which, with a view of preventing the objections hereinbefore referred to, are constructed in such a manner that the nut, on being tightened exerts upon the locking means to produce a substantially tangential stress opposed to the tightening direction of the nut, in addition to the well-known axial stress. With this arrangement the tightening of the nut stores up a tangential force in the locking washer and the washer is provided with a plurality of teeth-like projections distributed along its periphery which are caused to act upon the nut in such a manner that the nut is continuously submitted to a progressive tightening action.

To this end, my improved locking and tightening means comprises a lock washer disposable between a support and a bolt head or nut and comprising a spring strip wound in helical form having portions inherently yieldably spaced one above the other and respectively provided with upper and lower sharp edged flaps or sections substantially radial to the axis of the helix. Each of said flaps is downwardly inclined in a direction reverse to nut-tightening direction, a lower part of each upper flap being inherently yieldably disposed above the upper part of a lower flap, whereby, when the nut is tightened, the upper flap is forced against the lower flap and caused to slide downwardly and rearwardly upon the lower flap in a direction reverse to nut tightening direction, tensioning the washer, the sharp edges biting into the nut or head and the support. Should the bolt then lengthen, as by heat expansion or stretching, the tension of the washer tends to move the sharp edges axially to hold them in biting engagement, and tends to move them relatively tangentially to tighten the nut.

In the drawing, in which several forms of the invention are shown diagrammatically by way of example;

Fig. 1 shows a fragmental edge view of one form of the locking or securing washer with upwardly bent outer peripheral sections;

Fig. 2 is a plan of the washer of Fig. 1;

Fig. 3 is an edge view of another form of washer having inner marginal upwardly bent sections disposed in a fan-like overlapping fashion;

Fig. 4 shows a plan of the washer of Fig. 3;

Fig. 5 shows a section on the line 5—5 of Fig. 6 of a washer similar to the one shown in Figs. 3 and 4, but in which sections of the same convolution do not overlap;

Fig. 6 is a plan of the washer of Fig. 5;

Fig. 7 is a plan of a part of a strip from which the locking washer may be obtained by bending the strip in a spiral-like fashion, the strip having simple incisions for the construction of the upwardly bent sections;

Fig. 8 shows a similar strip with recesses enlarged towards the margin for forming the inner peripheral lapping segments;

Fig. 9 shows a similar strip with T-shaped incisions;

Fig. 10 shows another form of strip with recesses between the several sections reduced towards the margin or retaining the same width between the sections;

Fig. 11 shows a cross-section of strip of trapezoidal cross-section for the manufacture of the washer the section being largest at the space not occupied by the upwardly bent sections;

Fig. 12 shows a section of another form of strip with stepped rectangular cross section;

Fig. 13 shows another form of strip with L-shaped cross-section;

Fig. 14 shows a section of another form of strip with T-shaped cross section;

Fig. 15 is an elevation showing a bolt having thereon the washer of Figs. 1 and 2 and with the nut tightly secured;

Fig. 16 shows the assembly of Fig. 15 with increased space for the washer as a result of the lengthening of the bolt through influences of temperature, use and the like; and Figs. 17 and 18 are diagrammatic views corresponding to Figs. 15 and 16 respectively each showing two superposed sections of adjoining windings, Fig. 18 showing the sections disposed upon each other according to Fig. 16 with the distance between nut and base being enlarged, and ready to slide to the position of Figs. 15 and 17 when the nut is tightened.

My improved securing means or lock washer 10 is shown disposed between a support 11 (Fig. 16) and a nut 16 and comprises a single spring strip a (Fig. 2) in helical form having portions 12 and 13 (Fig. 1) of the helix overlapping and inherently spaced one above the other to form upper and lower winding portions 12 and 13. A marginal portion of the strip is formed with transverse slits b (Fig. 7) forming flaps d, d1, d2 (Figs. 1 and 18) therebetween disposed substantially radial to the axis of the helix and having biting side edges 14 and 15 (Figs. 1 and 18).

Each of said flaps d1, d2 is downwardly inclined, relative to the length of the adjacent portion of the strip, in a direction reverse to nut-tightening direction as shown in Fig. 18, a lower marginal portion of the lower face of the flap d1 of said upper portion 12 being inherently disposed above the upper marginal portion of the upper face of the flap d2 of the lower portion, whereby when the nut 16 is tightened in the direction of the arrow 17 of Fig. 16, said winding portions 12 and 13 are forced toward each other, and each upper flap d1 (Fig. 18) is forced against the lower flap d2, thereby causing each upper flap d1 to slide downwardly and rearwardly upon the flap d2 beneath, in a direction reverse to nut-tightening direction to the position of Figs. 15 and 17, thereby tensioning the washer axially and also tangentially, and causing biting edges 14 and 15 of the flaps to engage the nut 16 or head and support 11 respectively, whereby, on bolt lengthening (as caused by heat expansion or stretching), the tension axial of the washer causes said edges 14, 15 to continue to bite, while the tangential tension tends to move the flaps back toward the position of Fig. 18 and to tighten the nut.

The strip a may have rectangular cross section of unchanging height, or may be provided with steps as in the strip a2 (Fig. 12) or which may present a trapeze-like cross-section as in the strip a (Fig. 11), or an L-shaped section as in the strip a3 (Fig. 13), or a T-shaped cross-section as in the strip a4 (Fig. 14) or other similar cross-section the margin of reduced cross section being provided with incisions b (Fig. 7) or with cut-out portions c (Fig. 8) so as to provide the sections or flaps d which are twisted or inclined in a fan-like fashion. The strip a after having been provided with the inclined flaps or sections d, or previous to this procedure, is wound, so as to form a helix or spiral which extends more than one winding so as to form the superposed portions 12 and 13. It is of advantage in ordinary cases to cause the spiral to extend two turns, as appears from Figs. 1–6.

When strip of constant thickness and the rectangular cross section is not used, the margin of reduced thickness is used for the making of the flaps or sections d, the thicker continuous portion of the strip serving for obtaining an increased resisting force and tensional strength for such continuous part. The increase of cross section for the continuous part of the strip a may be provided by one or two longitudinal ribs or ledges of increased thickness extending, if desired, as far as the inclined fan-like flaps or sections d will allow. The sections or flaps d of adjacent windings are a certain distance apart one above the other in the inherent or non-tensioned condition of the spiral, as in Fig. 16, previous to its compression to the condition of Fig. 15; and when compressing the spiral in the axial direction, the flaps or sections are partially overlapped, as in Fig. 18. Upon continuing the compression of the spiral, the oppositely disposed sections or flaps d1, d2 of windings in proximity of each other slide upon each other and produce a contraction of the spiral contrary to the nut-tightening direction of rotation of the nut to be secured, such sliding continuing until the edge faces of the flaps d make contact with the adjacent edge faces of the flap of the adjoining winding. In this compressed and tensioned condition of the spiral, the tooth-like projecting sharp edges 14, 15 of the flaps or sections d are forced into the supporting surface of the support 11 and into the opposite face of the nut 16, thereby preventing its rotation in the direction of any releasing or loosening action. The spiral-like washer which in this manner has been subjected to great tension, particularly in the tangential direction, operates with a tangential force the amount of which depends upon the formation of the sectional area of the part of the strip which is not covered by the sections d and on the distance of the sliding movement of the sections d upon each other, the nut being thereby urged in the tightening rotary direction. Now, should there be lengthening of the locked bolt caused by changes of temperature or stretching or other conditions and a consequent of an increase of the space between the nut and the support to be employed for the securing of the screws, the flaps or sections d sliding upon each other will tend to return to the original position by the action of the strain or tension that was stored in the spiral during the tightening of the nut. This tendency to return to the original position exerts, through the projections of the flaps, a torque upon the nut in nut-tightening rotary direction so that the nut is gradually turned in this direction, maintaining the nut tight until the stored tension is exhausted. The amount of the tension stored in the spiral upon the tightening of the nut is governed by the size and formation of the cross section the continuous portion unaffected by the sections or flaps d and the degree of inclination of said flaps or sections d. As an example, an angle of 30 to 35° with relation to the surface of the nut is suggested.

At the point of transition from one winding to the other, the spiral strip may be provided with flaps d, or without flaps as shown at a5 of Fig. 3. In the case of quantity production of the spirals from a strip a already provided with upwardly bent sections or flaps $d$, it will be of advantage to provide such sections $d$ throughout the entire length of the spiral. For the manufacture of the flaps or sections $d$, I may provide incisions $b$ according to Fig. 7 extending at right angle to the longitudinal edge, or T-shaped incisions $b2$ according to Fig. 9, or incisions $c$ the width of which is increased towards the margin (Fig. 8), or incisions $c2$ reduced in width towards the rim (Fig. 10).

When the nut is tightened to the position shown in Fig. 15, the superimposed section members $d$ of the spiral windings where they are superposed on each other assume the relative position shown diagrammatically in Fig. 17, after the upper flap $d1$ has moved upon the lower flap $d2$ along a horizontal distance $h$ (Fig. 17) and through a vertical distance $v$. At the same time the tightening of the nut causes the spiral to be submitted to an axial tension (which may be represented by $Pa$) and the tangential tensioning force $Pt$ produced by the sliding movement. During this procedure the flap or section $d1$ has moved along an axially parallel path $V$ and a rotary path $h$ contrary to the tightening rotation of the nut. Thus a resulting tensioning force $Pr$ is produced in the spiral by means of which the washer acts upon the nut in the rotary tightening direction by means of the tooth-like projections of said sections $d$. In case of changes of temperature or other influences causing the lengthening of the bolt to be secured under these conditions, so as to cause an increase of the space between the nut and the support, as appears from Fig. 16, the spiral has the tendency to assume the position shown diagrammatically in Fig. 18 in which the flap $d1$ tends to slide back upon the flap $d2$ in which case the tension $Pt$ produces a tightening force upon the nut in the direction of the tightening torque thereof. Hence, the locking washer does not only operate, by its axial tangential tensions, as a locking means against unintended releasing of the nut but also furnishes a means for the additional tightening of the nut, as soon as the bolt is lengthened by influences of any kind, even if this lengthening should be only temporary. The inclination of the flaps $d$ is selected in such a manner as to cause the flap $d1$ to move upwardly when it moves in the direction of tightening rotation, there being different inclinations for right-handed and left-handed threads respectively. In the compression and contraction of the spiral during the tightening of the nut, the flap $d$ of one of the windings slides upon the flaps of the other winding, and they perform at the same time a rotary movement for the distance $h$ in Fig. 17 in the opposite rotary direction with relation to the tightening direction.

In view of the fact that by the inclination of the sections $d$ a greater height is produced than that corresponding to the cross section of the strip $a$, this strip may be increased in height or may be provided with protuberances in the shape of longitudinal webs at that part of the cross section which is not occupied by the flaps $d$, without thereby reducing or limiting the tension of the securing means at the tightening of the nut. The axial tension impressed upon the spiral at the tightening of the nut and the tangential or rotary tension will be increased in accordance with the free cross-sectional space left by the sections $d$, or the more this space is provided with special longitudinal stiffening ribs or the like. The flaps $d$ may be either provided at the outer periphery in accordance with Figs. 1 and 2 or at the inner periphery, as shown in Figs. 3 to 6. They may however be also arranged at both the inner and outer peripheries. For the purpose of increasing the tangential or rotary tension it is preferable, particularly with comparatively small lock washers, to provide only one periphery with flaps $d$. Within one and the same winding the sections $d$ may overlap or not, as desired. The recesses between the flap sections $d$ are constructed either as incisions or as cut-out portions with unchanging width, or with a width of which is either reduced or enlarged towards the margin in accordance with the desired arrangement of the flap sections at the outer or inner periphery respectively.

As the material for the strip $a$, steel ribbon or any other suitable constructional material with or without subsequent tempering or hardening or the like may be employed.

I claim as my invention:

1. A securing means comprising plural overlapping biting parts adapted for engagement with a nut or the like and a support respectively; means for yieldably holding said parts spaced and against relative rotation and in said engagement; a means associated with said parts respectively for causing said parts to move reversely to nut-tighten direction during nut tightening.

2. A locking means disposable between a support and a nut and comprising a spring strip in helical form having a longitudinally continuous portion having windings inherently spaced one above the other and respectively provided with upper and lower flaps lateral to the continuous portion and having biting side edges; each of said flaps being downwardly inclined in a direction reverse to nut-tighting direction, a part of each upper flap being inherently disposed above a part of a lower flap.

3. Locking means as in claim 2 in which the longitudinal continuous portion is thicker in cross-section than the flaps.

4. Locking means as in claim 2 in which the flaps are provided at the outer periphery of the helix.

5. Locking means as in claim 2 in which the flaps are at the inner periphery of the helix.

6. Locking means as in claim 2 in which windings overlap substantially throughout the windings.

7. Locking means as in claim 2 in which the flaps are provided at inner and outer peripheries.

8. Locking means as in claim 2 in which adjacent flaps of the same winding overlap.

9. Strip as in claim 2 in which the space between adjacent flaps tapers toward the edge of the strip.

10. Strip as in claim 2 in which the space between adjacent flaps tapers toward said continuous portion.

11. A lock washer disposable between a support and a nut and comprising a spring strip in helical form having portions inherently spaced one above the other and respectively provided with upper and lower flaps substantially radial to the axis of the helix and having biting side edges; each of said flaps being downwardly inclined in a direction reverse to nut-tightening direction, a lower part of each upper flap being inherently disposed above the upper part of a lower flap; whereby, when the nut is tightened, the upper flap is forced against the lower flap and caused to slide downwardly and rearwardly upon the lower flap in a direction reverse to nut tightening direction, thereby tensioning the washer, whereupon on bolt lengthening, the tension of the washer tends to tighten the nut.

12. A lock washer disposable between a support and a nut and comprising a spring strip in helical form having portions spaced one above the other to form upper and lower portions; the strip being formed with lateral flaps having biting side edges and downwardly inclined, relative to the tangent of the adjacent portion of the strip, in a direction reverse to nut-tightening direction, a lower margin of each flap of said upper portion being inherently disposed above an upper margin of a flap of the lower portion; whereby when the nut is tightened, each upper flap is forced against the lower flap, thereby causing each upper flap to slide downwardly upon the flap beneath in a direction reverse to nut tightening direction, thereby tensioning the washer axially and tangentially, and causing biting edges of the flaps to engage the nut and base respectively; whereby, on bolt lengthening, the action of tangential tension tends to tighten the nut.

13. A lock washer disposable between a support and a bolt head or nut and comprising a single spring strip in helical form having portions of the helix overlapping and inherently spaced one above the other to form upper and lower winding portions; a marginal portion of the strip being formed with transverse slits forming flaps therebetween disposed substantially radial to the axis of the helix and having biting side edges; each of said flaps being downwardly inclined, relative to the length of the adjacent portion of the strip, in a direction reverse to nut-tightening direction, a lower marginal portion of the lower face of each flap of said upper portion being inherently disposed above the upper marginal portion of the upper face of a flap of the lower portion; whereby when the nut is tightened, said winding portions are forced toward each other, and each upper flap is forced against the lower flap, thereby causing each upper flap to slide downwardly upon the flap beneath and in a direction reverse to nut tightening direction, thereby tensioning the washer axially and tangentially, and causing biting edges of the flaps to engage the nut or head and base respectively; whereby, on bolt lengthening, the tension axial of the washer causes said edges to continue to bite, and the tangential tension tends to tighten the nut.

14. A securing means comprising a pair of groups of holding parts, the groups being adapted for holding engagement with a nut or the like and a support respectively; means for holding said parts spaced around the axis of the nut; means for yieldably holding said groups against relative rotation around said axis; and a means for causing said parts to move reversely to nut-tighten direction thereby to tension said yieldable means.

15. A securing means comprising a pair of groups of holding parts, the groups being adapted for holding engagement with a nut or the like and a support respectively; means for holding said parts spaced around the axis of the nut; means for yieldably holding said groups against relative rotation around said axis; and a means associated with said parts respectively for causing said parts to move reversely to nut-tighten direction during said engagement during nut tightening.

16. A securing means comprising a pair of groups each comprising two or more of biting parts, the groups being adapted for engagement with a nut or the like and a support respectively; means for holding said parts of each group substantially evenly spaced around the axis of the nut; means for yieldably holding said groups against relative rotation around said axis; and a means associated with said parts respectively for causing said parts to move reversely to nut-tightening direction thereby to tension said yieldable means whereby said yieldable means may be held under such tension by the tightened nut.

17. A securing means comprising biting parts adapted for engagement with a nut and base respectively; means for yieldably holding said parts spaced and against relative rotation and spaced in said engagement; and a means associated with said parts respectively for causing said parts to move reversely to nut-tightening direction during nut tightening and holding said parts positively projected to biting position after the nut is tightened.

18. A securing means comprising a pair of groups of biting parts, the groups being adapted for biting engagement with a nut or the like and a support respectively; means for holding said parts spaced around the axis of the nut; means for yieldably holding said groups against relative rotation around said axis; and a means associated with said parts respectively for causing said parts to move reversely to nut-tightening direction during said engagement during nut tightening, and holding said parts positively projected in biting position after the nut is tightened.

19. A locking means disposable between a support and a nut and comprising a spring strip having portions inherently spaced one above the other and respectively provided with upper and lower flaps having biting side edges; each of said flaps being downwardly inclined in a direction reverse to nut-tightening direction, a lower part of each upper flap being inherently disposed above the upper part of a lower flap.

ADOLF THODE.